(12) United States Patent
Okuyama et al.

(10) Patent No.: US 7,058,679 B2
(45) Date of Patent: Jun. 6, 2006

(54) APPARATUS FOR TRANSMITTING CONNECTING STATUS AND METHOD OF DISPLAYING CONNECTING STATUS

(75) Inventors: Takehiko Okuyama, Kanagawa-ken (JP); Noriko Inoue, Tokyo (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 557 days.

(21) Appl. No.: 10/330,499

(22) Filed: Dec. 30, 2002

(65) Prior Publication Data

US 2003/0140135 A1 Jul. 24, 2003

Related U.S. Application Data

(62) Division of application No. 09/199,430, filed on Nov. 25, 1998, now Pat. No. 6,529,951.

(30) Foreign Application Priority Data

Nov. 25, 1997 (JP) .................................. 9-323247
Nov. 25, 1997 (JP) .................................. 9-323248

(51) Int. Cl.
G06F 15/173 (2006.01)
(52) U.S. Cl. ........................................ 709/23; 715/736
(58) Field of Classification Search ........ 709/220–224, 709/227–228, 250, 253; 715/744, 735–736
See application file for complete search history.

(56) References Cited

U.S. PATENT DOCUMENTS

| 5,504,757 | A |  | 4/1996 | Cook et al. .................... 370/84 |
|---|---|---|---|---|
| 5,687,319 | A |  | 11/1997 | Cook et al. ................... 370/256 |
| 5,724,517 | A |  | 3/1998 | Cook et al. ................... 709/223 |
| 5,793,366 | A |  | 8/1998 | Mano et al. ................... 345/329 |
| 5,883,621 | A | * | 3/1999 | Iwamura ......................... 725/37 |
| 5,887,193 | A |  | 3/1999 | Takahashi et al. .............. 710/8 |
| 6,003,074 | A | * | 12/1999 | Vasconcellos ................ 709/220 |
| 6,131,119 | A |  | 10/2000 | Fukui ........................... 709/224 |
| 6,160,796 | A |  | 12/2000 | Zou ............................. 370/257 |
| 6,332,159 | B1 |  | 12/2001 | Hatae et al. .................. 709/224 |
| 6,333,739 | B1 | * | 12/2001 | Koyama et al. ............... 715/744 |
| 6,392,695 | B1 | * | 5/2002 | Watamoto et al. ............ 348/173 |
| 6,603,488 | B1 | * | 8/2003 | Humpleman et al. ........ 715/771 |
| 6,810,452 | B1 | * | 10/2004 | James et al. .................. 710/104 |
| 6,826,632 | B1 | * | 11/2004 | Wugofski ....................... 710/8 |

FOREIGN PATENT DOCUMENTS

EP 0 637 157 A 2/1995

(Continued)

OTHER PUBLICATIONS

"IEEE Standard for a High Performance Serial Bus," IEEE Computer Society, IEEE Std 1394-1995, Aug. 30, 1996.

(Continued)

Primary Examiner—Abdullahi Salad
(74) Attorney, Agent, or Firm—Pillsbury Winthrop Shaw Pittman LLP

(57) ABSTRACT

On the basis of information of a topology map, a parent node ID list is generated to show correspondence of ID of each node to that of its parent node. Information given by the parent node ID list is transmitted as connection display data in a predetermined format. The receiving side, on the basis of the received connection display data, obtains information of a connecting status display to display connecting status of a network. On the basis of this information, a display to show connecting status of the network is displayed.

14 Claims, 16 Drawing Sheets

FOREIGN PATENT DOCUMENTS

| | | |
|---|---|---|
| EP | 0 739 110 A | 10/1996 |
| JP | 1-147444 | 10/1989 |
| JP | 9-282263 | 10/1997 |
| JP | 9-330298 | 12/1997 |
| WO | WO 97/49057 | 12/1997 |

OTHER PUBLICATIONS

Japanese Patent Unexamined Publication Gazette, Jun. 4, 1996, Hei 9-330297, (Industrial Technology Institute Foundation).

* cited by examiner

FIG.4

| 10 | phy_ID | 0 | L | gap_cnt | sp | del | c | pwr | p0 | p1 | p2 | i | m |
|---|---|---|---|---|---|---|---|---|---|---|---|---|---|
| LOGICAL REVERSAL OF FIRST QUADRATE ||||||||||||||

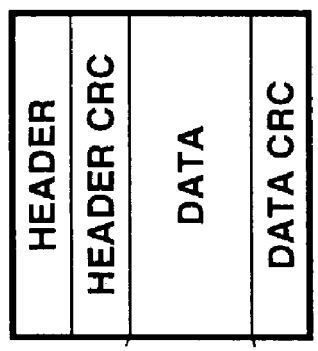
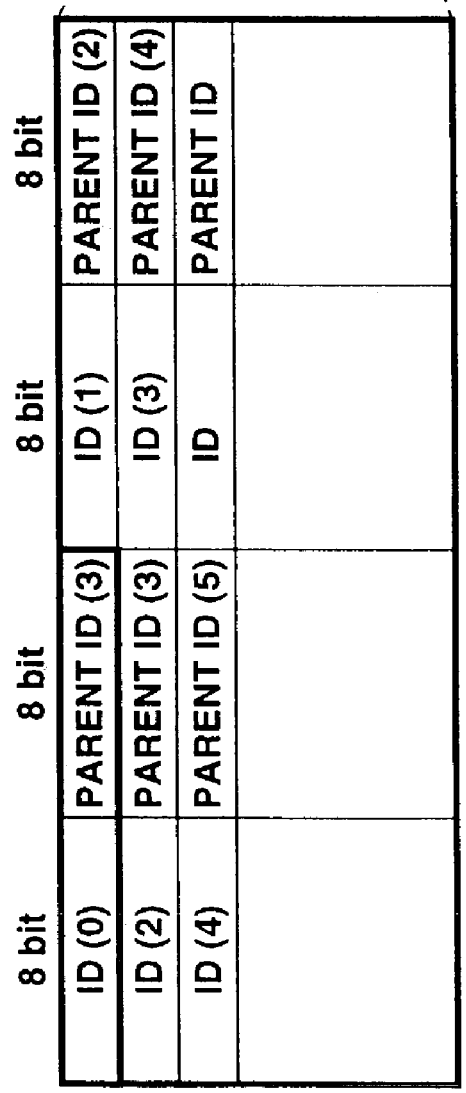

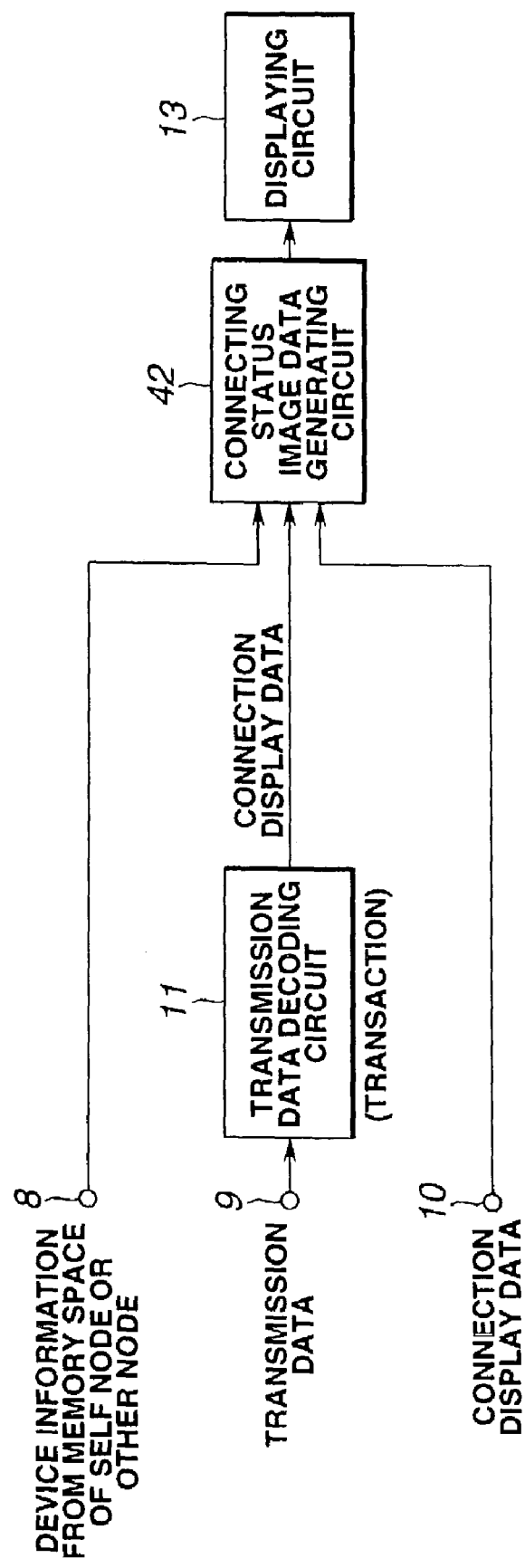

APPARATUS FOR TRANSMITTING CONNECTING STATUS AND METHOD OF DISPLAYING CONNECTING STATUS

This is a Divisional Application of U.S. application Ser. No. 09/199,430 filed Nov. 25, 1998 now U.S. Pat. No. 6,529,951, the entirety of which is hereby incorporated by reference.

BACKGROUND OF THE INVENTION

1. Field of the Invention

The present invention relates to an apparatus for transmitting connecting status, an apparatus for generating display data thereof and a method of displaying the same suitable for networks corresponding to the IEEE 1394 standard.

2. Related Art Statement

In recent years, IEEE (The Institute of Electrical and Electronics Engineers, Inc.) 1394 has prevailed as a unified standard for digital interface systems and as a low-cost peripheral interface suitable for multimedia use in order to transmit and receive data among digital image devices. IEEE 1394 enables multiplex transfer of a plurality of channels. IEEE 1394 has also become a digital interface suitable for image transmission because it has an isochronous transferring function which assures the transfer of image and voice data in a given period of time.

IEEE 1394 can form topologies in daisy-chain and tree shapes, and each bus is able to be connected with up to 63 nodes.

As IEEE 1394 allows such free connecting forms, it becomes convenient when a display of present connecting status is permitted. Present connecting status is designed to be managed by a bus manager provided in a predetermined single node in a bus.

However, not all nodes with functions of bus manager have displaying parts. Consequently, in order to display connecting status, connecting information from a bus manager should be transmitted to a node having a displaying part, but there is no standard for transmission formats to transmit connecting information.

It is possible, in this case, too, to display connecting status using a displaying part of another node by generating image data showing a display of connecting status from connecting information of a bus manager and transmitting these image data. In this case, however, the amount of data to transmit becomes enormous increasing burdens on both sides of a bus manager and a displaying part.

Meanwhile, data transfer protocol of IEEE 1394 is defined by three layers (hereinafter also defined as 1394 layers), a physical layer, a link layer and a transaction layer. Though these IEEE 1394 layers have been standardized, there is no common standard, for display layers which regulate management of hardware and provision of user interface at a node using operating system (hereinafter referred to as OS). Similarly, there is no common API (Application Programming Interface), which is a standardized interface for applications to use services such as OS.

Recently, in the fields of information equipment and home appliances, there has been a tendency to make these display layer and API common. However, API cannot be made common because standardization of data formats for connecting information from a bus manager has not been realized yet.

Another problem is that, in IEEE 1394, a maximum number of hierarchies (hop count) from a root is limited to 16 when connection is done in a tree-shape. When connecting status is not displayed in an easy way to secure the hop count, users might connect exceeding a maximum hop count permitted. Besides, when connection exceeded a maximum hop count, it is not simple to distinguish equipment which should be disconnected.

As stated above, there have been problems; that no standard exists for data to transmit connecting status displays from a bus manager having topology information to a display layer having displaying functions or from a node having a bus manager with topology information to a node which is a displaying equipment with no such function; and as a result, that it is impossible to display connecting status without increasing burdens on both of the outputting side of connecting information and the displaying side. Another problem is that it has been impossible to design display layers and API's as common devices. Another problem is that there has been no display of connecting status to allow the hop count to be secured easily.

OBJECTS AND SUMMARY OF THE INVENTION

It is an object of the present invention, by standardizing transmission formats for connecting information, to enable connecting status to be displayed without increasing burdens on either side to output connecting information and a side to display, and at the same time, by making interface of a 1394 layer and API or a display layer common, to provide an apparatus for transmitting connecting status which enables a display of common displays at all indicators, an apparatus for generating display data of connecting status, and a method of displaying connecting status.

It is another object of the present invention to provide an apparatus for transmitting connecting status which enables displays of connecting status through which the hop count can be secured easily, an apparatus for generating display data about connecting status, and a method of displaying connecting status.

An apparatus for transmitting connecting status according to the present invention comprises a computing means for computing correspondence of ID of each node to that of its parent node on the basis of data showing port status in a topology map of a network and generating parent node ID information; and a data outputting means for generating connection display data in a predetermined data format out of the parent node ID information and transmitting the data, or generating transmission data in a predetermined transmission data format out of the connection display data and transmitting the data onto the network.

An apparatus for generating connecting status display data according to the present invention comprises an image data generating means where connection display data in a predetermined data format, which are generated on the basis of parent node ID information to show correspondence of ID of each node to that of its parent node in a network, or transmission data in a predetermined transmission data format, which are generated on the basis of the connection display data, are inputted and image data are generated in order to display connecting status of the network on the basis of the inputted connection display data or of connection display data fetched from the transmission data.

A method of displaying connecting status according to the present invention comprises a procedure to compute correspondence of ID of each node to that of its parent node on the basis of data, which show status of ports in a topology map of a network, and to generate parent node ID information, a procedure to generate and transmit connection display data in a predetermined data format out of the parent node ID information or to generate transmission data in a predetermined transmission data format out of the connection display data and to transmit the data onto the network, and a procedure to have the connection display data or the transmission data transmitted through a predetermined transmission path inputted and to generate image data for displaying connection status of the network on the basis of the inputted connection display data or connection display data fetched from the transmission data.

Other features and advantages of the present invention will be explained clearly enough in the following description.

BRIEF DESCRIPTION OF THE DRAWINGS

FIG. 4 illustrates a self ID packet.

FIGS. 7A and 7B illustrate formats for connection display data and transmission data.

FIG. 14 is a block diagram showing an apparatus for generating connecting status display data according to another embodiment of the present invention.

DETAILED DESCRIPTION OF THE PREFERRED EMBODIMENTS

Figure 1:
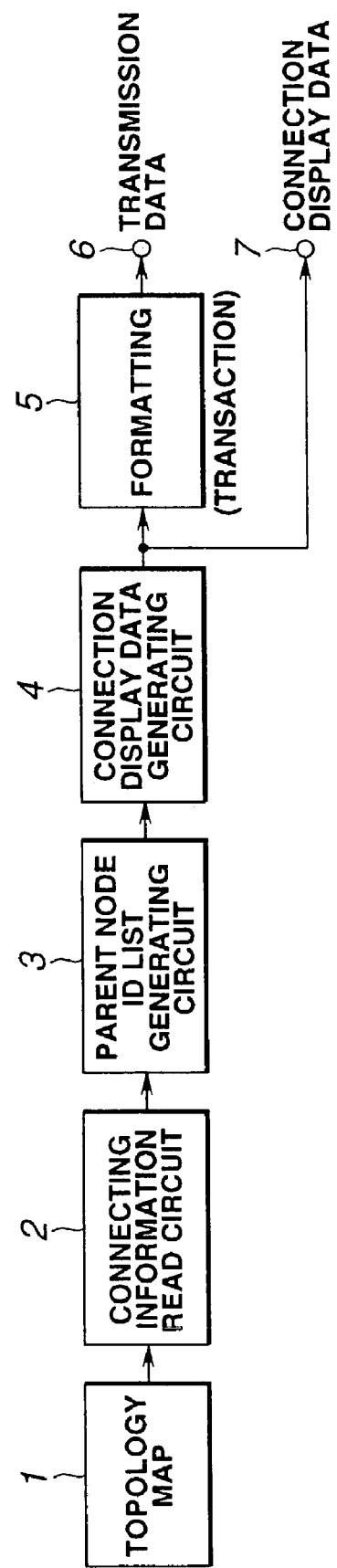
FIG. 1 is a block diagram showing an embodiment of an apparatus for transmitting connecting status according to the present invention.
Figure 2:
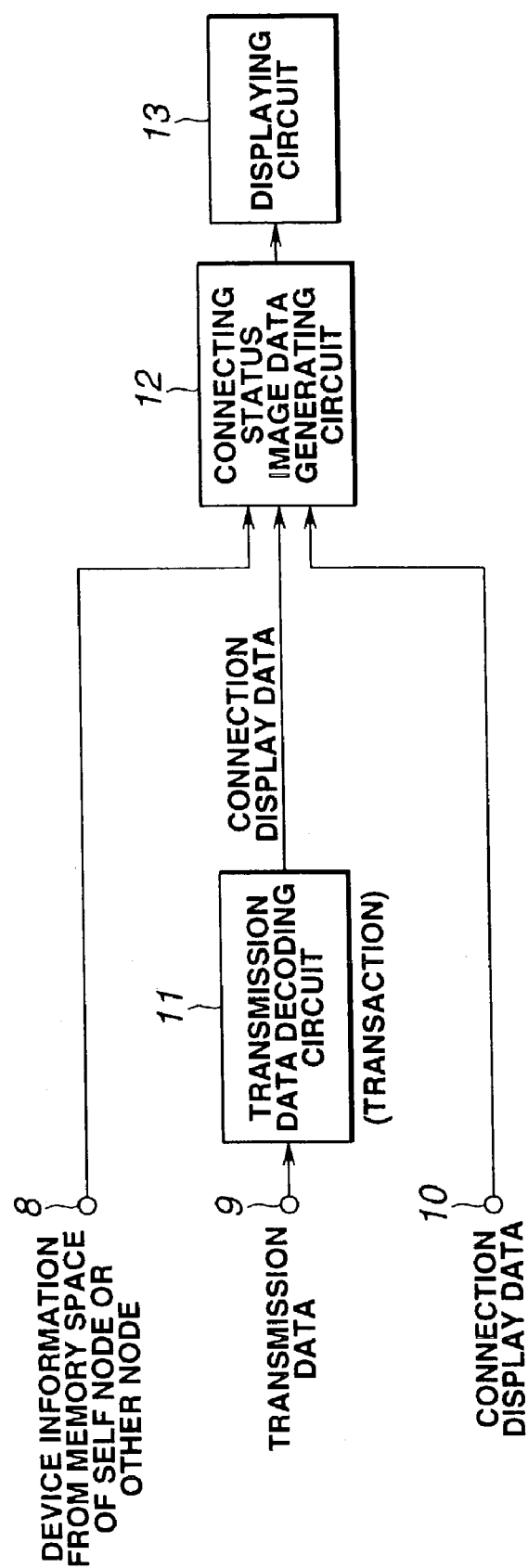
FIG. 2 is a block diagram showing an embodiment of an apparatus for generating connecting status display data according to the present invention.
Figure 3:
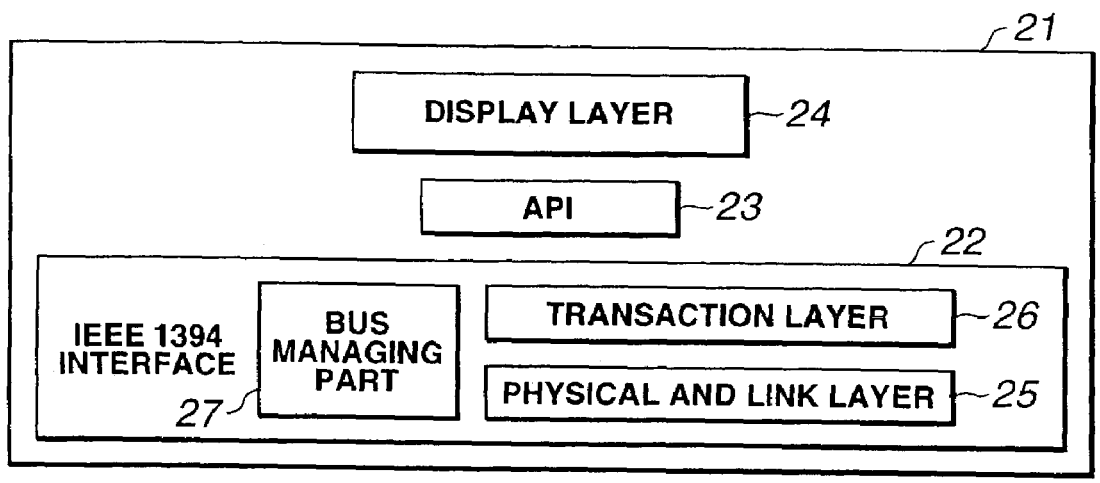
FIG. 3 is a block diagram to explain nodes connected with a network which meets the IEEE 1394 standard.

The present invention will now be described in detail with reference to the accompanying drawings which illustrate its embodiments. FIGS. 1 and 2 are block diagrams to show embodiments, respectively, of an apparatus for transmitting connecting status and of an apparatus for generating connecting status display data according the present invention. FIG. 3 is a block diagram showing a protocol configuration of IEEE 1394.

In FIG. 3, a protocol configuration of a node 21 includes the IEEE 1394 interface 22, the API 23 and the display layer 24. The IEEE 1394 interface 22 has a bus managing part 27 as well as three of 1394 layers, a physical and link layer 25 and a transaction layer 26.

The physical and link layer 25 is an interface of a physical layer and a link layer, and performs, at the physical layer, encoding and decoding processes of transmission data, bus arbitration process and interfacing process with medium, and at the link layer, transmitting/receiving of packets and cycle control.

The transaction layer 26 regulates transmission of commands and protocol of receiving, and transmits/receives transmission data to/from transmission media (IEEE 1394 bus), which are not shown, through the physical and link layer 25.

The transaction layer 26 transmits data, commands or functions together with the display layer 24 through the API 23. The API 23 is an interface for applications to use services such as OS, and the display layer 24 manages hardware and provides user-interface. For example, when the display layer 24 has a displaying part, displaying on the basis of the connection display data inputted through the API 23 becomes possible if connection display data are standardized.

At a specified node on a bus of IEEE 1394 (not shown), a bus managing Part 27 is provided at the IEEE 1394 interface 22. The bus managing part 27 is for performing node control and bus management, such as control of cycle master, control to optimize functions, power supply management, transmission speed management and configuration management. Control of nodes enables communication between nodes.

As described above, on IEEE 1394, each node is connected in daisy-chain or tree shape. When power is supplied, bus reset takes place and information about connecting status of nodes (connecting information) is initialized. At the time of initialization of nodes, each node has information about whether it is in a branch connected with a plurality of other nodes or in a leaf connected with only 1 node or in non-terminating status.

On IEEE 1394, when bus reset takes place, topology is distinguished first. That is, after bus reset, all leaf nodes send parent-notify signals, a notice from a child node to a parent node, through a port where the branch node is connected (hereinafter referred to as parent port). A branch node which receives the parent-notify signal sends child-notify signals, a notice from a parent node to a child node, through a port where the signal was received (hereinafter referred to as child port). Through this process, parentage is determined between two nodes.

Out of ports connected with other nodes, a branch node with a port, which has received neither parent-notify signals nor child-notify signals, sends parent-notify signals through this port. Out of two nodes whose ports are connected with each other, the one which received a parent-notify signal earlier becomes a parent node, and the other becomes a child node.

After repetition of the same process, a parent node determined last in a bus becomes a root. After topology is distinguished, node ID is distinguished.

That is, each node is given a node ID with a lower ID number, when it is connected with a port with a lower port number among nodes in each layer. And, a node ID with a lower number is added to a node which is connected with a lower side of hierarchy. Consequently, connection is done to a port with a lowest number among nodes in each layer, including root, and a node ID of a leaf node, which is positioned in the lowest layer from the root, becomes 0. When a branch node in the upper layer side of a node, whose node ID is 0, has only 1 child node, this branch node becomes node ID 1, and when it has 2 or more child nodes, a node ID of a leaf node, which is connected with the second lowest port number and positioned in the lowest layer, becomes 1.

A node, whose node ID is 0, first broadcasts that its self node ID is 0 to other nodes. Then, other nodes make the number of self node ID packets received from other nodes at the broadcast time their self node ID. In the order described above, each node broadcasts its self node ID until all nodes broadcast their self node IDs.

Self node IDs from each node are transmitted by self ID packets. FIG. 4 illustrates a configuration of a self ID packet.

As shown in FIG. 4, in a self ID packet, "10" is arranged at the head, followed by phy_ID, "0", "L", gap_cnt, sp, del, c, pwr, p0, p1, p2, i, m showing self node IDs, then, in the next 32 bits, logical reversal signals of a first quadrate are arranged. Among self ID packets, p0, p1, p2 respectively show three port statuses in 2 bits each, "11" shows that it is connected with child nodes, "10" shows that it is connected with a parent node, "01" shows no connection with other nodes, and "00" shows no ports. In case there are 4 or more ports in a node, p3, p4, . . . , are supposed to be transmitted in the next quadrate to show port status.

The bus managing part 27 has a bus manager which is not shown. The bus manager is supposed, to be given self ID packets transmitted from all nodes and to generate a topology map, a set of first quadrates of all self ID packets.

In FIG. 1, a connecting information read circuit 2 is designed to read information of a topology map 1 generated by a bus manager in the bus managing part 27. The connecting information read circuit 2 outputs information, which it reads, to a parent node ID LIST generating circuit 3.

Figure 5:
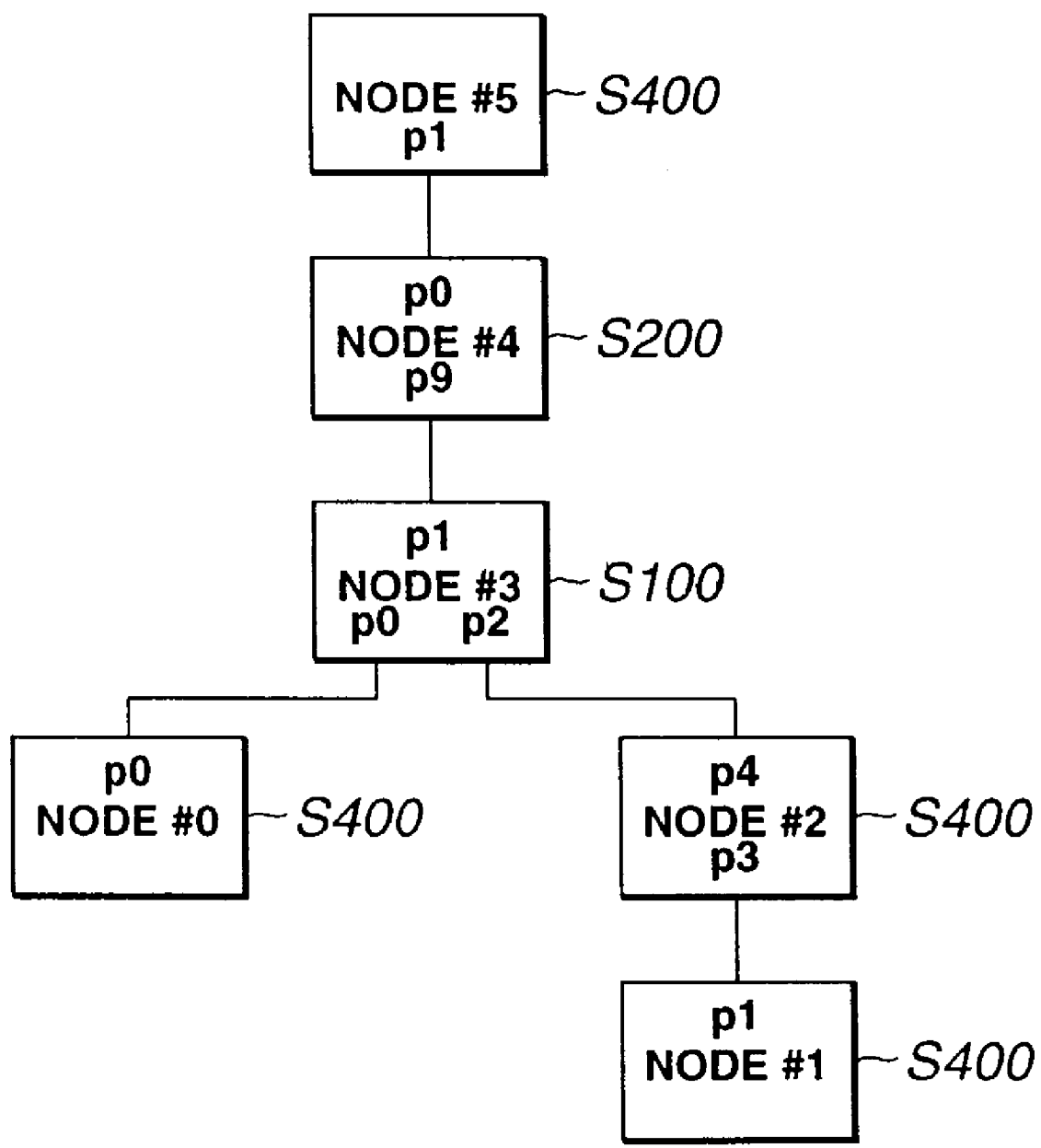
FIG. 5 illustrates an example of connection on a network.
Figure 6:
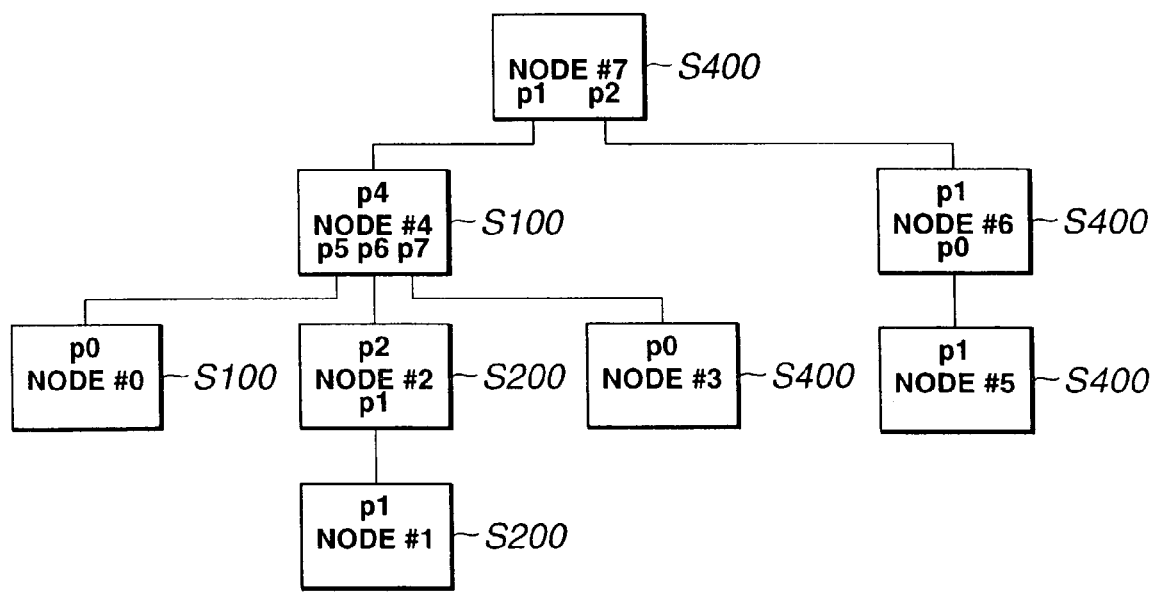
FIG. 6 illustrates an example of connection on a network.

FIGS. 5 and 6 illustrate the parent node ID list generating circuit 3.

FIG. 5 shows the state of a bus with six nodes, to which nodes #0 to #5 are connected. And, in the example in FIG. 5, port numbers are expressed with figures next to a code (p). Each node #0 to #5 is respectively allotted #0 to #5 as its node ID through the distinguishing method of node ID. A node whose node ID is 5 is a root.

While only one parent node can exist for each node, plural child nodes can exist. By this reason, the parent node ID list generating circuit 3 is designed to compute ID of a parent node against each child node to enable to secure connecting status. The parent node ID list generating circuit 3 examines IDs of child nodes of each node first, then, computes a parent node of each node on the basis of the result.

As described above, when each port is connected with a child node, data p0, p1 and p2 in a self ID packet are "11". The parent node ID list generating circuit 3 first examines, about all nodes on a network, the data to show port status, p0, p1 and p2, to count the number of child ports where child nodes are connected (hereinafter referred to as child number).

For example, p0 and p2, the data contained in a self ID packet outputted from a node #3, are both "11", and the parent node ID list generating circuit 3 detects that child number of node #3 is 2. Table 1 below provides information which shows child number of each node counted by the parent node ID list generating circuit 3 in the example in FIG. 5.

TABLE 1

| Node ID | 0 | 1 | 2 | 3 | 4 | 5 |
|---------|---|---|---|---|---|---|
| Child number | 0 | 0 | 1 | 2 | 1 | 1 |

Next, the parent node ID list generating circuit 3 examines nodes having child ports, that is, nodes having child nodes, starting with one having the lowest node number, to compute node ID of child nodes. When a parent node has only one child port, ID of a child node is a number obtained by subtracting 1 from ID of the parent node. In the example in FIG. 5, as apparent in Table 1 above, there is no child port for nodes #0 and #1. The node having a child port and the lowest node number is, judging from Table 1, node #2 whose node ID is 2. Since the child number of node #2 is 1, child node to this node is node #1 whose node ID is 1 (=2−1).

The parent node ID list generating circuit 3, then, examines the next node #3 whether it has any child ports. Node #3, as shown in Table 1, has 2 child ports. Consequently, for node #3, at least one child node is node #2 whose node ID is smaller than 3 by 1. The other child node for node #3 is a node, whose node ID is lower than that of node #2, and one which has not become a child node of other node. As node #1 is a child node of node #2, the other child node for node #3 is node #0 whose node ID is 0.

Through a similar procedure, the parent node ID list generating circuit 3 examines node IDs of child nodes of each node in order of lower node number. In the example in FIG. 5, as shown in Table 1, child number of node #4 and node #5 are both 1. Consequently, node ID of child node of these nodes are 3 and 4 respectively.

In this way, the parent node ID list generating circuit 3 computes node IDs of child nodes of each node. The parent node ID list generating circuit 3, using the fact that any node, except a root, is connected with 1 parent node, seeks for the relation of node ID of each node to that of its parent node by tracing back information about child nodes connected to each node. Table 2 below shows the relations between each node and its parent node.

TABLE 2

| Node ID | 0 | 1 | 2 | 3 | 4 |
|---------|---|---|---|---|---|
| Node ID of parent | 3 | 2 | 3 | 4 | 5 |

FIG. 6 shows a state of a bus with eight nodes, to which nodes #0 to #8 are connected. In this example, too, each of nodes #0 to #7 is allotted #0 to #7 as its node ID respectively by the node ID distinguishing method. A node allotted node ID 7 is a root.

In this case again, the parent node ID list generating circuit 3 is supposed to examine first ID of child nodes of each node, then, to compute a parent node of each node. That is, the parent node ID list generating circuit 3 examines, on all nodes on a network, p0, p1 and p2, data showing port status, to count child numbers.

Table 3 below provides information to show child number of each node counted by the parent node ID list generating circuit 3.

TABLE 3

| Node ID | 0 | 1 | 2 | 3 | 4 | 5 | 6 | 7 |
|---------|---|---|---|---|---|---|---|---|
| Child number | 0 | 0 | 1 | 0 | 3 | 0 | 1 | 2 |

Next, the parent node ID list generating circuit 3 examines nodes having child ports in order of the lowest node number to compute node IDs of child nodes. In the example in FIG. 5, as apparent in Table 3 above, there is no child port for nodes #0 and #1. Since child number of the next node #2 is 1, a child node for this node is node #1 whose node ID is 1 (=2−1).

The next node #3 has no child port, and the following node #4 has 3 child ports as shown in Table 3. For node #4, at least 1 child node is node #3 whose node ID is 2, smaller than 3 by 1. Remaining 2 child nodes of node #3 are found, from Table 3, to be node #2 and node #0 which are nodes with node IDs lower than node #4 and have not become a child node of other nodes.

Through a similar procedure, the parent node ID list generating circuit 3 examines node ID of child nodes of each node in order of the lowest node number. In the example in FIG. 6, as shown in Table 3, child node of node #6 is node #5, and child nodes of node #7 are node #6 and node #4.

The parent node ID list generating circuit 3 seeks for relations of node ID of each node to that of its parent node on the basis of computed node IDs of child nodes of each node. Table 4 below shows relations of each node to its parent node in the case of FIG. 6.

TABLE 4

| Node ID | 0 | 1 | 2 | 3 | 4 | 5 | 6 |
|---|---|---|---|---|---|---|---|
| Node ID of parent | 4 | 2 | 4 | 4 | 7 | 6 | 7 |

The parent node ID list generating circuit 3 is designed to output generated information about ID relations between a node and its parent node to a connection display data generating circuit 4.

The connection display data generating circuit 4 generates connection display data in a predetermined data format out of inputted information, and outputs the data to a formatting 5. The formatting 5 is designed to convert the inputted connection display data into a transmission data format before outputting them.

FIG. 7A illustrates a connection display data format, and FIG. 7B illustrates a transmission data format.

As shown in FIG. 7A, the connection display data generating circuit 4 shows a node ID in 8 bits, and at the same time, it shows ID of its parent node in 8 bits so as to generate connection display data by grouping data of each node with its parent's. Figures in parentheses in FIG. 7A express node IDs in the example in FIG. 5.

FIG. 7B shows a configuration of an asynchronous packet of IEEE 1394. An asynchronous packet is formed by arranging a header, a header CRC, data and data CRC. The formatting 5 arranges connection display data at the part for data of an asynchronous packet of IEEE 1394. The formatting 5 is designed to arrange connection display data in an asynchronous packet before transmitting them.

Transmission data from the formatting 5 is transmitted to an IEEE 1394 bus through a terminal 6 which is not shown. Connection display data from the connection display data generating circuit 4 is also designed to be able to be outputted as they are through a terminal 7.

In FIG. 2, transmission data transmitted through an IEEE 1394 bus are supplied to a transmission data decoding circuit 11 through a terminal 9. the transmission data decoding circuit 11 is designed to depacket an inputted asynchronous packet and to supply connection display data arranged at the part for data to a connecting status image data generating circuit 12.

Sometimes, connection display data may be inputted to a terminal 10. In this case, connection display data from the terminal 10 are directly supplied to the connecting status image data generating circuit 12.

The connecting status image data generating circuit 12 is designed to generate, from inputted connection display data, image data to show connecting status of a network and to supply the data to a displaying circuit 13.

For example, the connecting status image data generating circuit 12, when the connection display data shown in FIG. 7A are inputted, generates connecting status image data shown in FIG. 5. That is, since the connection display data have node IDs and the IDs of their parent nodes arranged in order of lower node ID, the connecting status image data generating circuit 12 generates a display of boxes indicating nodes in their arranged order (in order of lower node ID) and a display indicating boxes of their parent nodes, connects them with lines. Thus, it sequentially arranges boxes correspondingly to connection display data, connects them with lines so as to generate image data for a display to show connecting status.

In addition, to the connecting status image data generating circuit 12, information about devices may be inputted from each node through a terminal 8. Device information is composed of a device name of each device, icons to express devices (graphic information) and so on. For WG of IEEE 1394, it is discussed to put device names, icon information of devices and so on in Configuration ROM, which is a memory space in each device stipulated by IEEE 1212 as well as being a memory space readable for other devices. For device information, information read from this memory space may be used.

The connecting status image data generating circuit 12, when device information is inputted from the terminal 8, is designed to generate image data to display information supplied by device information so as to display device names and icons of devices, instead of box displays and so on to show nodes.

The displaying circuit 13 is designed to display images based on image data from the connecting status image data generating circuit 12.

Meanwhile, the formatting 5 and the transmission data decoding circuit 11 can be realized by the physical and link layer 25 and the transaction layer 26.

Figure 8:
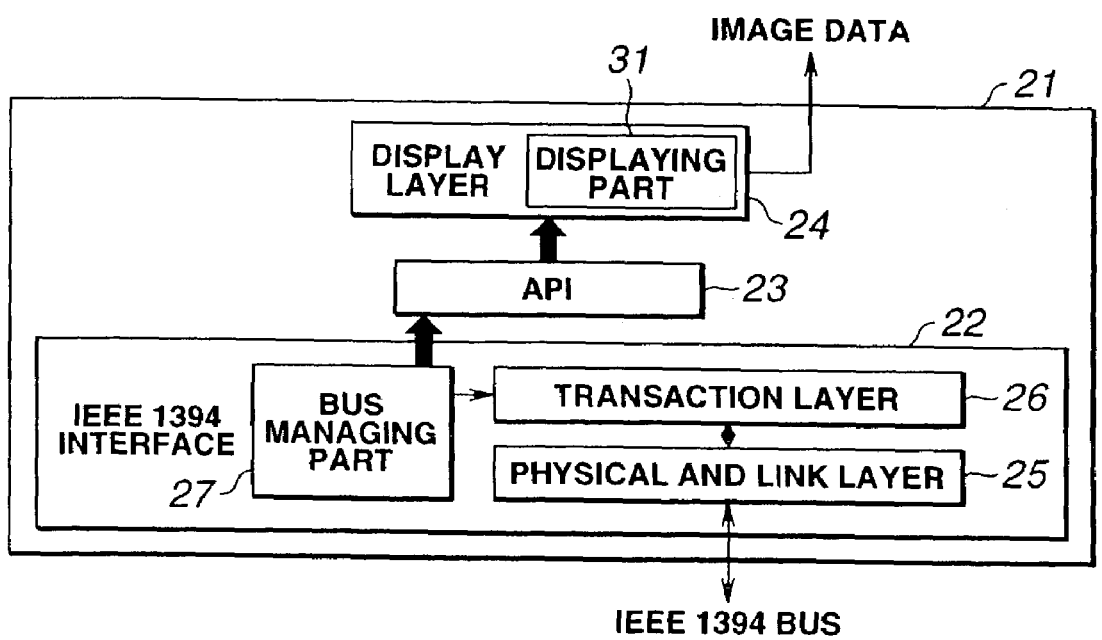
FIG. 8 illustrates an operation of an embodiment.
Figure 9:
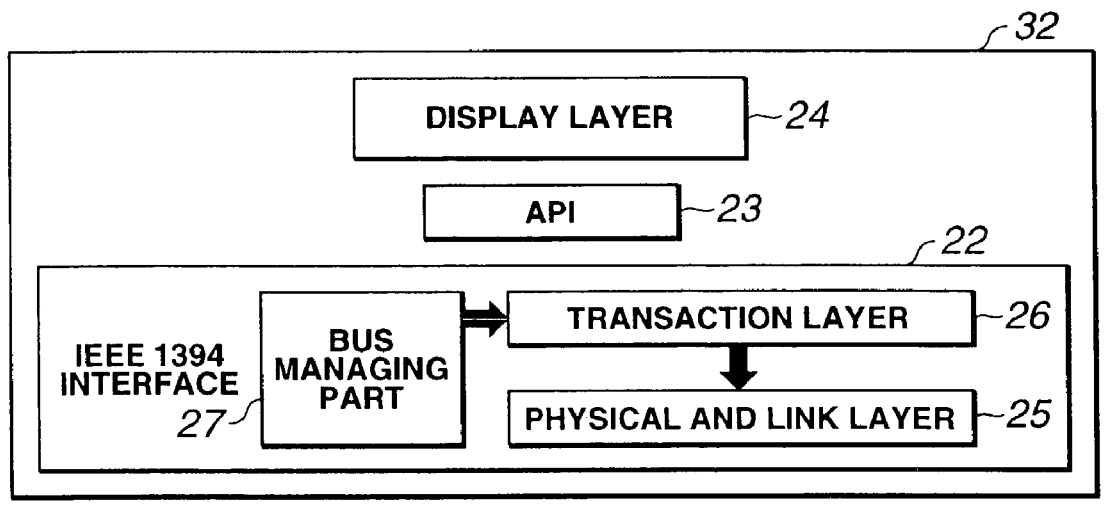
FIG. 9 illustrates an operation of an embodiment.
Figure 10:
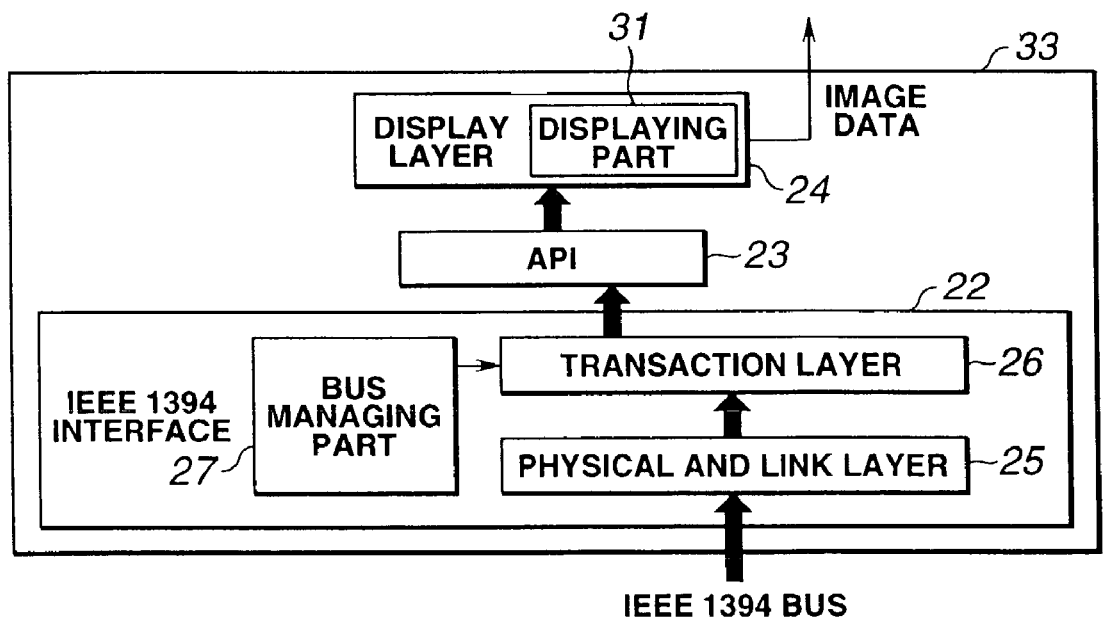
FIG. 10 illustrates an operation of an embodiment.
Figure 11:
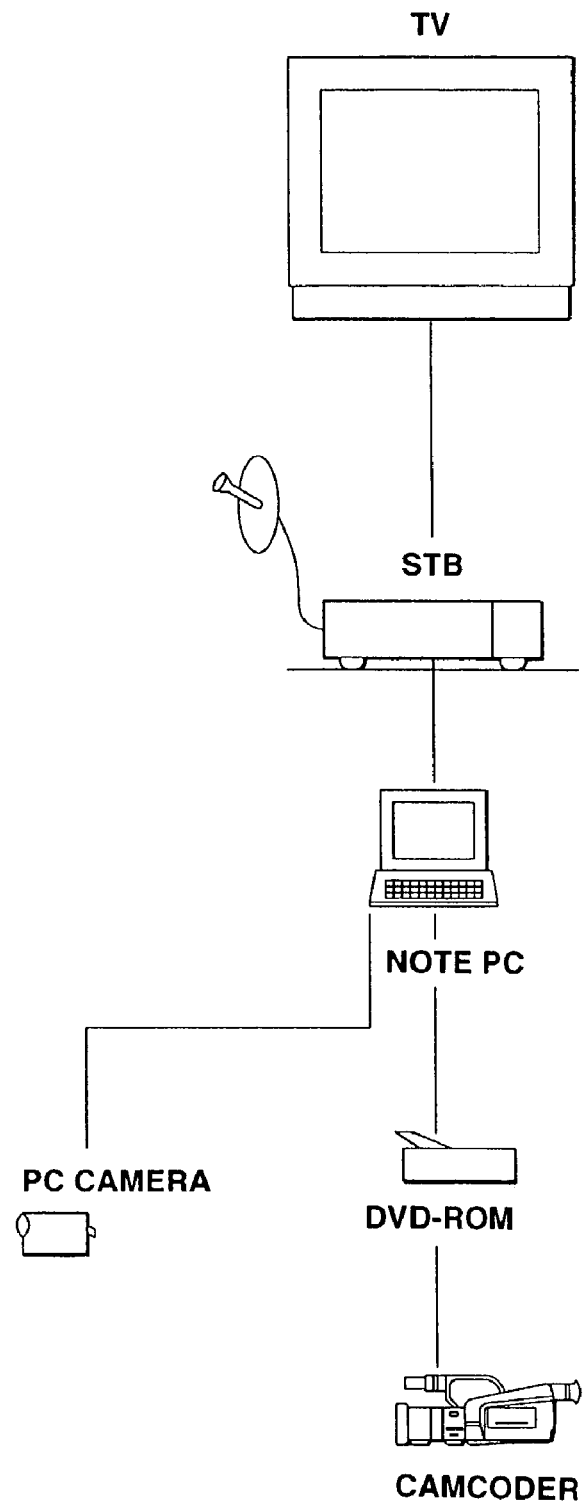
FIG. 11 illustrates a display of connecting status corresponding to FIG. 5.
Figure 12:
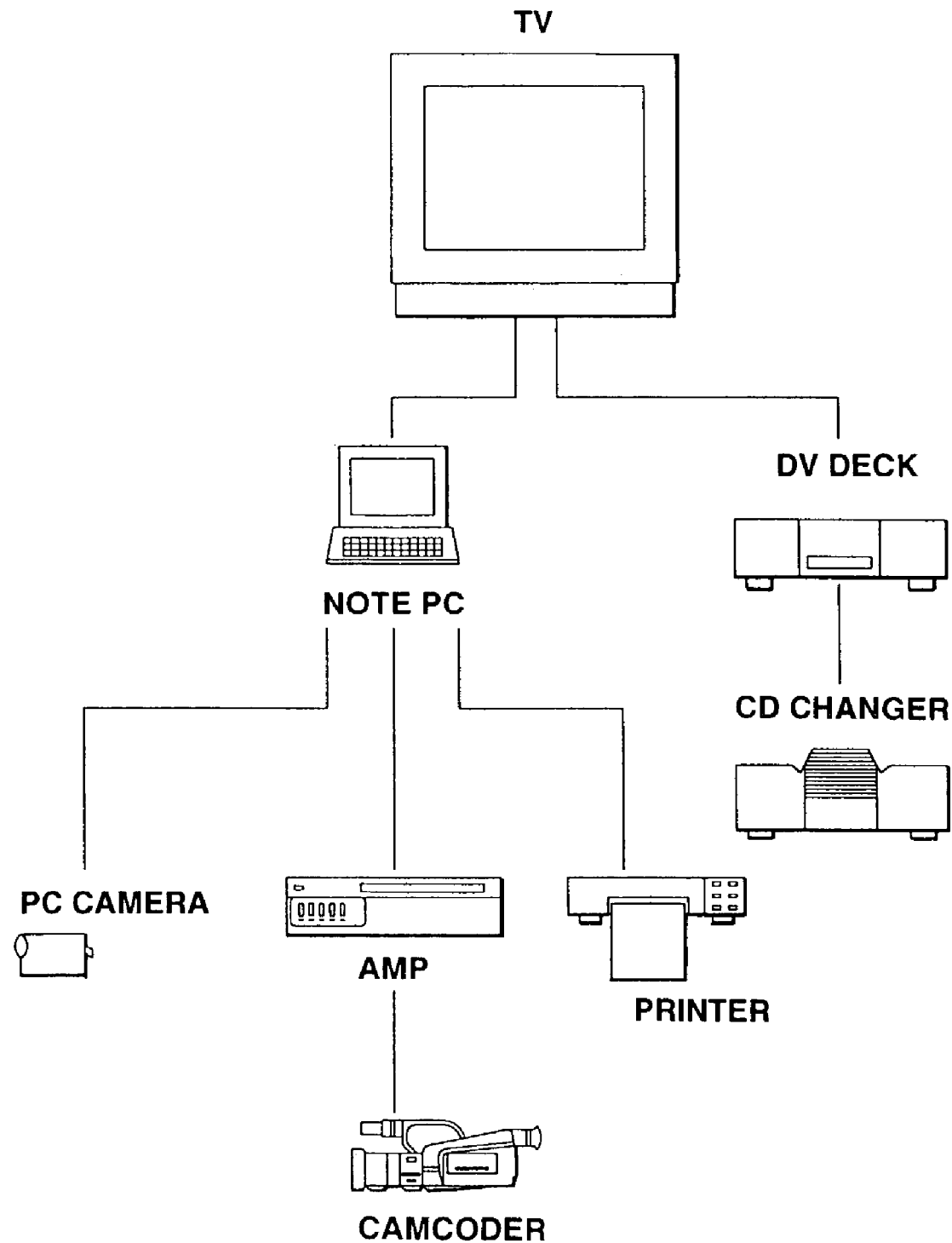
FIG. 12 illustrates a display of connecting status corresponding to FIG. 6.

Operation of an embodiment configured in such a way will be described with reference to FIGS. 8 through 12. FIGS. 8 through 10 illustrate flows of connection display data and transmission data shown by the arrow. FIGS. 11 and 12 illustrate examples of image display by the displaying circuit 13. FIGS. 11 and 12 show display examples corresponding to the topology of FIGS. 5 and 6 respectively.

Suppose, in FIGS. 1 and 2, that the topology map 1, the connecting information read circuit 2, the parent node ID list generating circuit 3, the connection display data generating circuit 4, the connecting status image data generating circuit 12 and the displaying circuit 13 are provided on devices of a same node. FIG. 8 shows an example of this case. The bus managing part 27 is supposed to have its functions provided by software. The connecting information read circuit 2, the parent node ID list generating circuit 3 and the connection display data generating circuit 4 in FIG. 1 are supposed to be composed by the bus managing part 27.

A node 21 receives self ID packets from each node through an IEEE 1394 bus. The self ID packets are supplied to the bus managing part 27 through the physical and link layer 25 and the transaction layer 26. The bus managing part 27 configures a topology map 1 from self ID packets.

The connecting information read circuit 2 composed by the bus managing part 27 reads information of the topology map 1, and gives it to the parent node ID list generating circuit 3. The parent node ID list generating circuit 3 generates a parent node ID list about every node to indicate which node is its parent node. The connection display data generating circuit 4 generates connection display data on the basis of the parent node ID list, and outputs the data from the terminal 7.

Connection display data are supplied from the bus managing part 27 to the display layer 24 through the API 23. The display layer 24 has a displaying part 31 which is supposed to have functions of the connecting status image data generating circuit 12 shown in FIG. 2.

Connection display data inputted through the terminal 10 are supplied to the connecting status image data generating circuit 12. The connecting status image data generating circuit 12 generates image data to show a display of connecting status of a network out of correspondence of each node to its parent node given by connection display data.

Suppose that the connection display data corresponds to Table 2 above. In this case, the connecting status image data generating circuit 12 first generates a display of a box to express that node ID is 0, next, on the upper side of this box, a box to express node #3, a parent node, and connects them with lines from a position of the box expressing node #0, where to correspond to the parent port, to a position of the box expressing node #3, where to correspond to the child port.

Then, the connecting status image data generating circuit 12 generates a display of a box to express that node ID is 1 on the basis of its connection display data, and on the upper side of this box, a box to express node #2, a parent node, and connects them with lines from a position of the box expressing node #1, where to correspond to the parent port, to a position of the box expressing node #2, where to correspond to the child port. Since the box expressing node #3, the parent node of node #2, has already been generated, the connecting status image data generating circuit 12 next connects with lines from a position of the box expressing node #2, where to correspond to the parent port, to a position of the box expressing node #3, where to correspond to the child port.

A similar operation is repeated after this. In this way, image data to display the connecting status shown in FIG. 5 are generated. The image data are supplied to the displaying circuit 13 (not shown) to be displayed on its screen. With this display, users can secure present connecting statuses easily. Display of S100, S200, and S400 in FIG. 5 expresses that the transfer rate is 100 Mbps, 200 Mbps, and 400 Mbps, respectively.

It may happen that device information is transmitted from each node through an IEEE 1394 bus. This device information is supplied to the displaying part 31 of the display layer 24 through the physical and link layer 25, the transaction layer 26, and the API 23 to be supplied to the connecting status image data generating circuit 12 which composes the displaying part 31.

In this case, the connecting status image data generating circuit 12, using the inputted device information, generates image data to display names and icons of, devices instead of boxes to express each node and the names of the nodes in FIG. 5.

FIG. 11 shows a display on a displaying screen of the displaying circuit 13 in this case. The example in FIG. 11 expresses that nodes #0 to #5 are a PC camera, a camcorder, a DVD-ROM, a notebook-type personal computer, a set-top box and a television receiver, respectively. With this display, users can easily secure what device a connected node actually corresponds to.

Although the description of FIG. 8 goes that all the topology map 1, the connecting information read circuit 2, the parent node ID list generating circuit 3, the connection display data generating circuit 4, the connecting status image data generating circuit 12 and the displaying circuit 13 in FIGS. 1 and 2 are provided on a device of a same node, it is apparent that a topology map, for example, may be positioned on another node, and functions of these circuits can be realized by a circuit other than the bus managing part 27 or by software.

FIG. 9 shows an example of a node 32 without a displaying part. Functions of each circuit shown in FIG. 1 are supposed to be realizable by, for example, the bus managing part 27 and others. Meanwhile, FIG. 10 shows a node 33 which has no functions of each circuit shown in FIG. 1, but has the displaying part 31 to realize functions of the connecting status image data generating circuit 12 in FIG. 2.

Now, suppose that a network is connected in the connecting status shown in FIG. 6. The bus managing part 27 in FIG. 9 generates connection display data corresponding to Table 4 above on the basis of the information on a topology map. The connection display data are supplied to the transaction layer 26 and the physical and link layer 25, and converted into a transmission data format corresponding to IEEE 1394 by the formatting 5 shown in FIG. 1, a function given to it. In this case, connection display data are arranged in parts for data in an asynchronous packet.

Transmission data from the physical and link layer 25 are transmitted to the node 33 shown in FIG. 10 through an IEEE 1394 bus. The node 33 fetches connection display data from transmission data by the transmission data decoding circuit 11 (shown in FIG. 2) which the physical and link layer 25 has as its function. The connection display data are supplied to the displaying part 31 of the display layer 24 through the API 23.

The connecting status image data generating circuit 12 of the displaying part 31 generates image data on the basis of connection display data in order to display connecting status shown in FIG. 6. The image data are given to the displaying circuit 13 to be displayed on its screen as shown in FIG. 6. Display of S100, S200, and S400 in FIG. 6 expresses transmission rates.

When the node 33 receives device information from other nodes through an IEEE 1394 bus, the connecting status image data generating circuit 12 of the displaying part 31 generates image data to display names and icons of devices instead of boxes shown in FIG. 6.

FIG. 12 shows an image display of this case. That is, in the example in FIG. 12, nodes #0 to #7 in FIG. 6 express that they are a PC camera, a camcorder, an amplifier, a printer, a notebook-type personal computer, a CD changer, a DV deck and a television receiver, respectively.

Thus, according to the embodiment of the present invention, the transmitting side generates a parent node ID list to show the correspondence between each node and its parent node on the basis of a topology map, and converts information of this parent node ID list into connection display data in a predetermined data format. It is also designed to convert the connection display data into a predetermined transmission data format before transmitting them. The receiving side is designed to obtain connection display data directly or from transmission data, and to generate, from the connection display data, image data in order to display connecting status. Therefore, when there is in a network a node having a function to generate image data from connection display data and to display them, connecting status can be displayed in a same format regardless of whatever device each node is, or even when the transmitting side and the receiving side are not on the same node, or when displaying devices are different.

Consequently, this is very effective when the display layer and the API are made common.

Particularly, this can provide a method for a displaying device to display connecting status in the simplest transmission data from a node, which is a bus manager having topology map information, to a node which is a displaying device without such a function.

In the embodiment, the description was given on an example when a node, which has the function of the connecting status image data generating circuit 12, reads device information from other nodes. However, it may be designed so that a node, which has the bus managing part 27, reads device information from other nodes and transmits it to a node having the function of the connecting status image data generating circuit 12.

That is, each circuit in FIGS. 1 and 2 may be formed in any node and anywhere in a node. As stated above, each circuit in FIGS. 1 and 2 may be realized by software. For example, the connecting status image data generating circuit 12 and the displaying circuit 13 may exist on different nodes. And, it maybe designed so as to make connection display data written in a read/write memory space of a device of a predetermined node, and make a node, which has the connecting status image data generating circuit 12, read connection display data stored in this memory space.

Besides, though the embodiment shown in FIGS. 1 and 2 uses connection display data to express the correspondence of ID between all nodes and their parent nodes in a network or transmission data of them, it may be designed to transmit device information on devices increased and decreased when there were increase and decrease of devices in a network.

That is, in IEEE 1394, bus reset occurs when there is a change in connecting status. As this is likely to bring about changes in ID values of each node, device information of nodes before and after bus reset is compared by, for example, the function of a bus manager or others, and devices increased and decreased are detected. As parent nodes of devices, which increased and decreased, are devices which existed before the bus reset, what to be transmitted as, for example, connecting status modified data is only device information on devices which increased and decreased and on devices which are their parent nodes.

In this case, the connecting status image data generating circuit 12 has a memory which updates connection display data therein corresponding to connecting status modified data transmitted afresh. Image data to show connecting status are generated corresponding to updated connection display data.

Through this procedure, connecting status after bus reset can be displayed even in this case.

Figure 13:
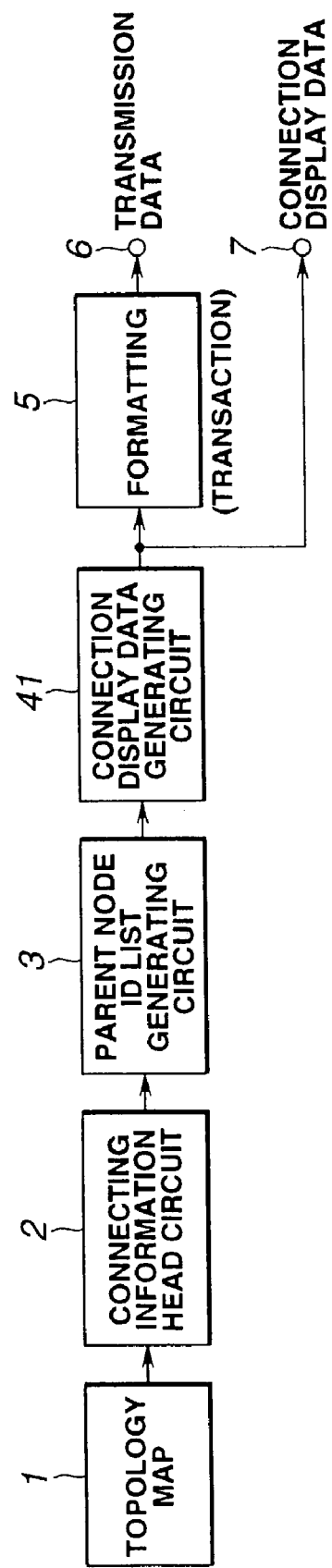
FIG. 13 is a block diagram showing an apparatus for transmitting connecting status according to another embodiment of the present invention.

FIGS. 13 and 14 are block diagrams showing other embodiments of the present invention. FIG. 13 shows an apparatus for transmitting connecting status, and FIG. 14 shows an apparatus for generating connecting status display data. In FIGS. 13 and 14, the same marks as in FIGS. 1 and 2 are given to the same components in order to simplify the description.

The embodiment shown in FIG. 13 differs from that shown in FIG. 1 only in that a connection display data generating circuit 41 is adopted instead of the connection display data generating circuit 4.

Figures 15A, 15B:
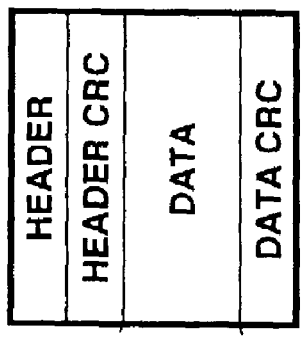
FIGS. 15A and 15B illustrate formats for connection display data and transmission data.
Figure 16:
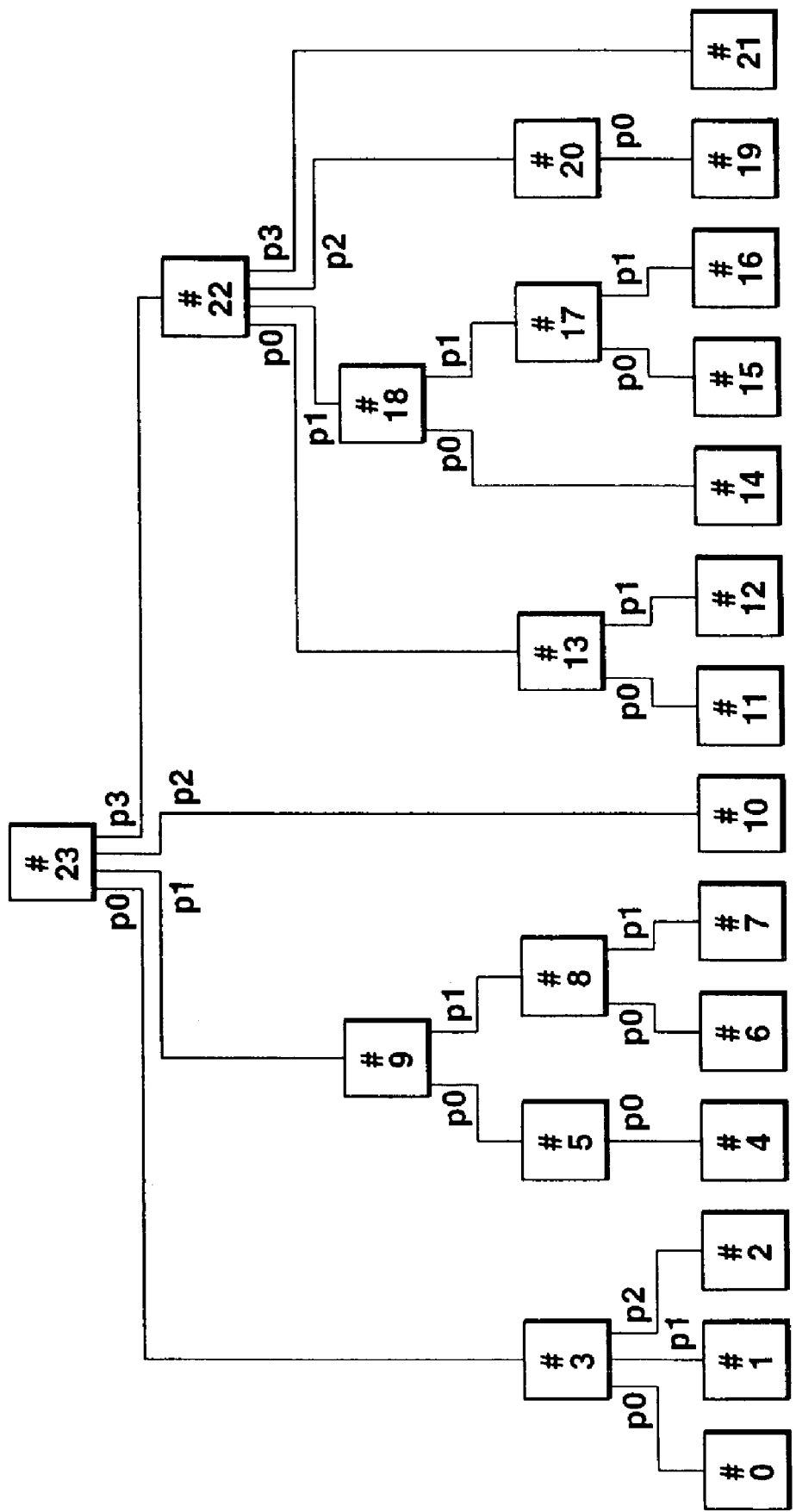
FIG. 16 illustrates an example of connection on a network.

FIGS. 15A, 15B and 16 illustrate the connection display data generating circuit 41 and the formatting 5. FIG. 15A shows a connection display data format, and FIG. 15B shows a transmission data format. FIG. 16 shows a status of 24 nodes, from node #0 to node #23, connected on a bus. In the example in FIG. 16, too, a port number is expressed with a figure following a mark (p). Each of nodes #0 to #23 is allotted from 0 to 23 as its node ID according to the method of distinguishing node ID. The node whose node ID is 23 is a root.

In the case of FIG. 16, the parent node ID list generating circuit 3 generates a parent node ID list shown in Table 5 below expressing the correspondence of ID between nodes and their parent nodes.

TABLE 5

| Node ID | 0 | 1 | 2 | 3 | 4 | 5 | 6 | 7 | 8 | 9 | 10 | 11 |
|---|---|---|---|---|---|---|---|---|---|---|---|---|
| Node ID of parent | 3 | 3 | 3 | 23 | 5 | 9 | 8 | 8 | 9 | 23 | 23 | 13 |
| Node ID | 12 | 13 | 14 | 15 | 16 | 17 | 18 | 19 | 20 | 21 | 22 | |
| Node ID of parent | 13 | 22 | 18 | 17 | 17 | 18 | 22 | 20 | 22 | 22 | 23 | |

The connection display data generating circuit 41 sequences node IDs on the basis of results of the parent node ID list. That is, the connection display data generating circuit 41 sequences node IDs so that the receiving side becomes able to display hierarchical connecting status using rules that a root has a highest ID value, a lower ID number is given to a leaf first, and a parent always has a higher ID value than its child does.

In the example of Table 5, the connection display data generating circuit 41 arranges 23, the node ID of a root, first at the head, then, node IDs of child nodes of the node #23 in order of lower number. Since Table 5 shows that node #23 has child nodes, nodes #3, #9, #10, #22 whose node IDs are 3, 9, 10, 22 respectively, 23 showing node ID is followed by 3, 9, 10 and 22 in arrangement.

Then, the child nodes are looked into in order of nodes #3, #9, #10, #22, and node IDs of child nodes are arranged in order of lower node ID. As child nodes of node #3 are, according to Table 5, nodes #0, #1, #2 whose node ID is 0, 1, 2 respectively, node IDs are arranged in this order. As child nodes of node #9 are, according to Table 5, nodes #5, #8 whose node ID is 5, 8 respectively, node IDs 5, 8 are arranged in this order. The next node #10 has no child node as shown in Table 5. Node IDs of child nodes of node #22 are, according to Table 5, 13, 18, 20 and 21.

Up to node #22, the connection display data generating circuit 41 arranges node IDs in order of node IDs 23, 3, 9, 10, 22, 0, 1, 2, 5, 8, 13, 18, 20 and 21.

Then, the connection display data generating circuit 41 sequnces node IDs in a similar way. That is, the connection display data generating circuit 41 next looks into child nodes of nodes in order of nodes #0, #1, #2, #5, #13, #18, #20, #21, and arranges found node IDs of child nodes in order of lower node ID.

After all, the connection display data generating circuit 41 arranges node IDs in order of node IDs 23, 3, 9, 10, 22, 0, 1, 2, 5, 8, 13, 18, 20, 21, 4, 6, 7, 11, 12, 14, 17, 19, 15 and 16 according Table 5.

The connection display data generating circuit 41 arranges sequenced node IDs in 8 bits as shown in FIG. 15A, and outputs them as connection display data to the formatting 5.

FIG. 15B shows a configuration of an asynchronous packet of IEEE 1394. An asynchronous packet is composed of a header, a header CRC, data and data CRC arranged. The formatting 5 arranges connection display data at the part for data of an asynchronous packet of IEEE 1394. The formatting 5 is designed to arrange connection display data in an asynchronous packet before transmitting them.

Transmission data from the formatting 5 are supposed to be sent to an IEEE 1394 bus, which is not shown, through the terminal 6. It is designed so that connection display data from the connection display data generating circuit 41 are also able to be outputted as they are through the terminal 7.

The embodiment shown in FIG. 14 differs from that shown in FIG. 2 only in point of that a connecting status image data generating circuit 42 is adapted instead of the connecting status image data generating circuit 12.

In FIG. 14, transmission data transmitted through an IEEE 1394 bus are, similarly to the embodiment shown in FIG. 2, supplied to the transmission data decoding, circuit 11 through the terminal 9. The transmission data decoding circuit 11 is designed to depacket inputted asynchronous packets, and to supply connection display data, which have been arranged in the part for data, to the connecting status image data generating circuit 42.

Sometimes, connection display data may be inputted to the terminal 10. In this case, connection display data from the terminal 10 are directly supplied to the connecting status image data generating circuit 42, similarly to the embodiment shown in, FIG. 2.

The connecting status image data generating circuit 42 is designed to generate, out of inputted connection display data, image data to show connecting status of a network, and to supply the data to the displaying circuit 13.

Figure 17:
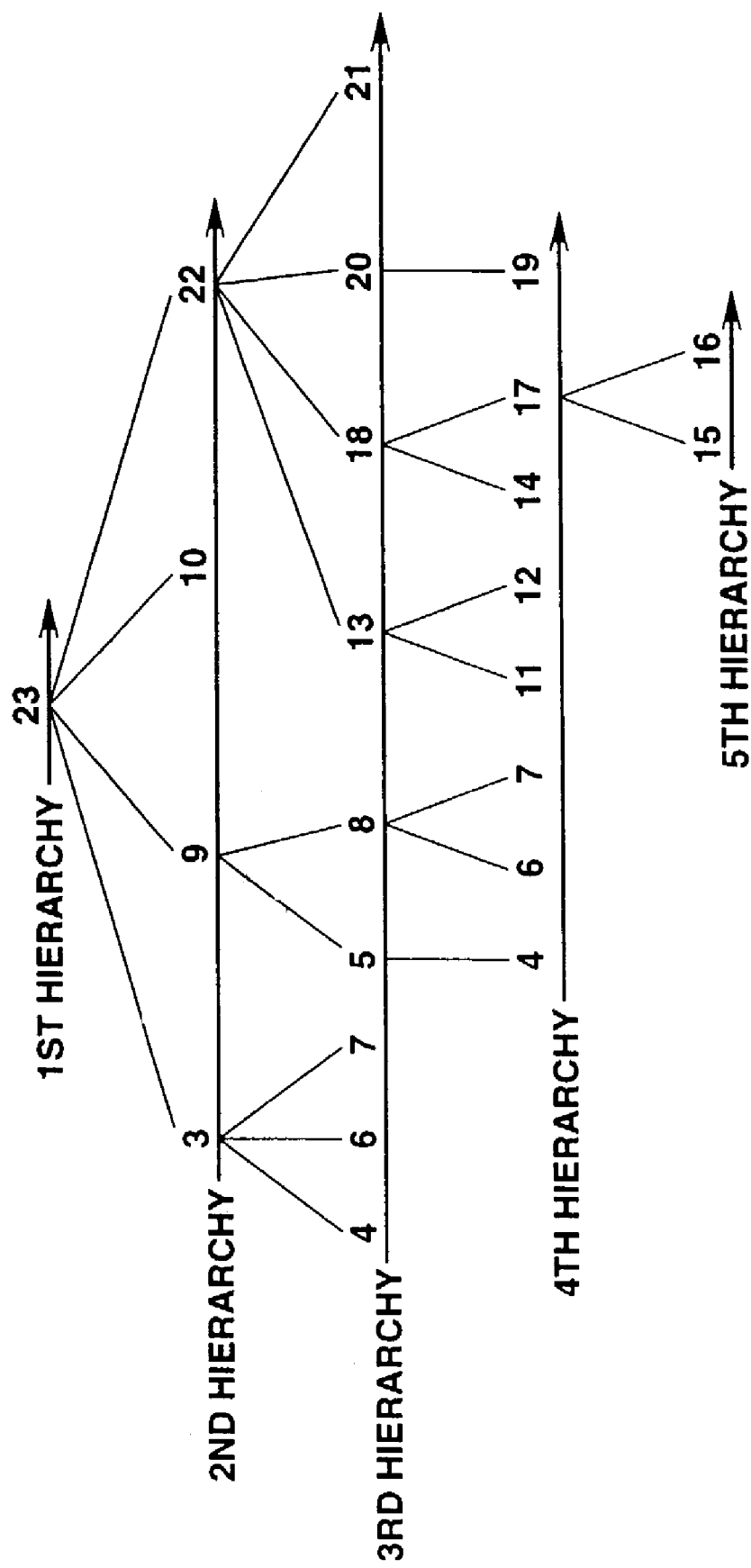
FIG. 17 illustrates a circuit 42 for generating connecting status image data in FIG. 14.

FIG. 17 illustrates the connecting status image data generating circuit 42 shown in FIG. 14. FIG. 17 corresponds to the connection display data shown in FIG. 15A.

For example, the connecting status image data generating circuit 42, when connection display data shown in FIG. 15A are inputted, generates image data to indicate the connecting status display shown in FIG. 17. The connecting status image data generating circuit 42 generates the connecting status display shown in FIG. 17, using the rules that; a root has a highest ID value, a lower ID number is given to a leaf first, and ID value of a parent is always higher than that of its child.

That is, the connecting status image data generating circuit 42 decides hierarchies from inputted connection display data. Connection display data shown in FIG. 15A have node values of 23, 3, 9, 10, 22, 0, 1, 2, 5, 8, 13, 18, 20, 21, 4, 6, 7, 11, 12, 14, 17, 19, 15, and 16 arranged in this order. According to the rules, in the data sequence, the part where lower node IDs than preceding node IDs are arranged is a breakpoint of a hierarchy. That is, in the example shown in FIG. 15A, breakpoints of hierarchy exist at 23→3, 22→0, 21→4, and 19→15.

Node ID 23 has the highest ID value showing that it is a root. The following 4 node IDs, node IDs 3, 9, 10 and 22 of node ID 3 to node ID 22, are allotted to nodes in a second hierarchy. The following 9 node IDs, node IDs 0, 1, 2, 5, 8, 13, 18, 20 and 21 of node ID 0 to node ID 21, are allotted to nodes in a third hierarchy.

In a similar way, the connecting status image data generating circuit 42 decides the hierarchy for nodes #0 to #23, expressed with node IDs 0 to 23 respectively, to belong to. In the example shown in FIG. 15A, node #23, a root, belongs to the 1st layer of hierarchy, nodes #3, #9, #10, and #22 to the 2nd layer of hierarchy, nodes #0, #1, #2, #5, #8, #13, #18, #20, and #21 to the 2nd layer of hierarchy, nodes #4, #6, #7, #11, #12, #14, #17, and #19 to the 4th layer of hierarchy, and nodes #15, #16 belong to the 5th layer of hierarchy.

The connecting status image data generating circuit 42, as shown in FIG. 17, generates a connecting status display to show each of nodes allotted to each of hierarchies, from the 1st to the 5th hierarchy. Next, the connecting status image data generating circuit 42 decides a node, which is in an upper layer, for a node in each hierarchy to be connected, that is, decides a node to be a parent node of each node.

The rules tell that a child node has a lower node ID than its parent node does. The connecting status image data generating circuit 42 decides a parent node for a node in each hierarchy by finding a node in one upper layer having a higher node ID than the node.

For example, nodes #3, #9, #10, #22 are nodes in the 2nd hierarchy. Among nodes in the 3rd hierarchy, nodes with lower node IDs than 3 are child nodes of node #3. Nodes belonging to the 3rd hierarchy are nodes #0, #1, #2, #5, #8, #13, #18, #20, #21, and nodes #0, #1, #2 are found to be child nodes of node #3. Child nodes of node #9 should be nodes in the 3rd hierarchy having node IDs higher than that of node #3 and lower than that of node #9. That is, child nodes of node #9 are nodes #5 and #8.

In a similar way, the connecting status image data generating circuit 42 looks into child nodes of all nodes, and displays a diagram to express parentage as shown in FIG. 17. The connecting status image data generating circuit 42 is designed to output image data to display a connecting status list shown in FIG. 17.

In addition, to the connecting status image data generating circuit 42, device information may be inputted from each node through the terminal 8. In this case, the connecting status image data generating circuit 42 can, similarly to the embodiment shown in FIG. 1, generate, using device information, image data to display names and icons of devices, which are provided by device information, instead of box display to express nodes.

The displaying circuit 13 is designed to display images on the basis of image data from the connecting status image data generating circuit 42.

The formatting 5 and the transmission data decoding circuit 11 can be realized by the physical and link layer 25 and the transaction layer 26.

Figure 18:
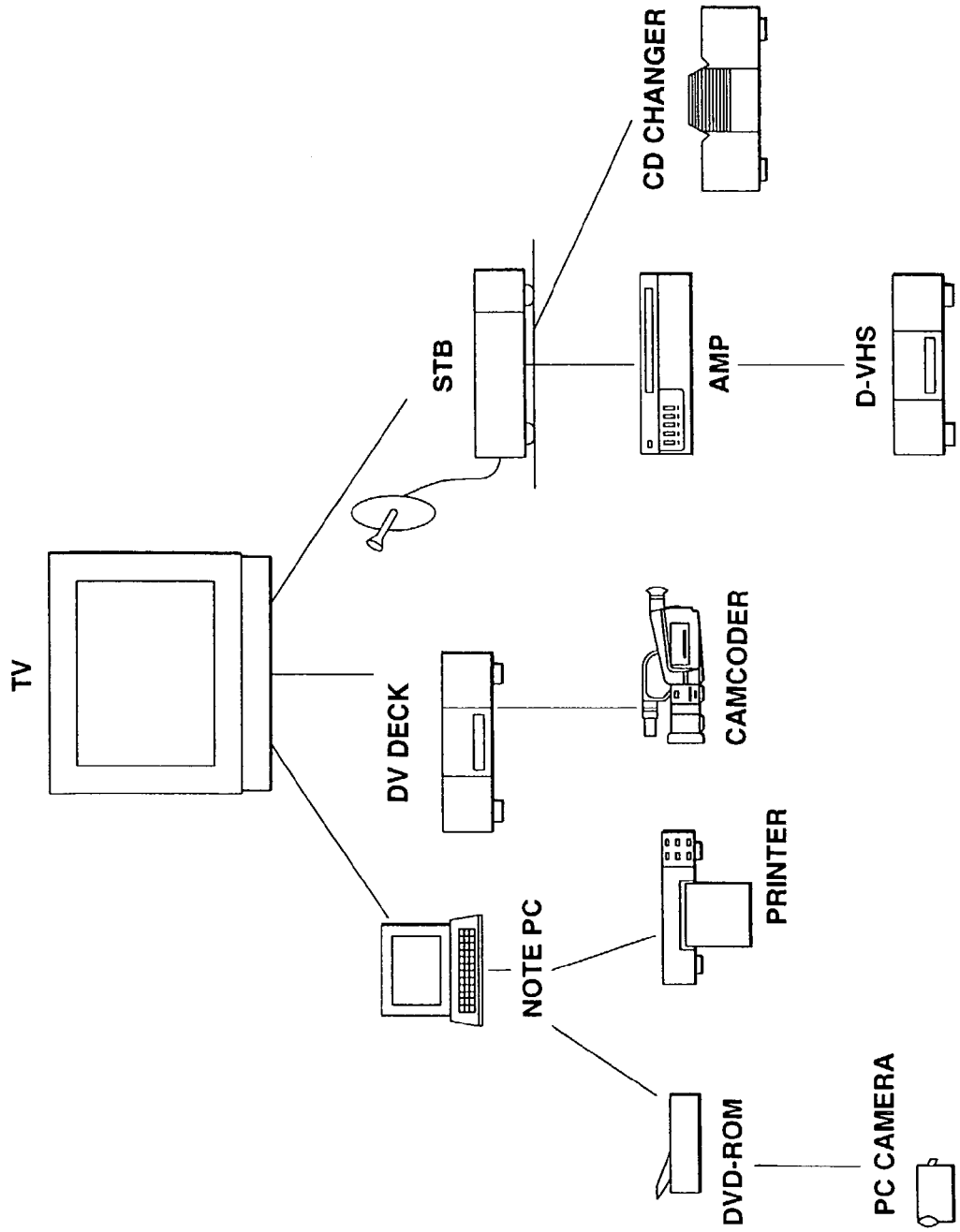
FIG. 18 illustrates a display of connecting status.

Now, operation of embodiments thus configured will be described with reference to FIGS. 16 through 18. FIG. 18 illustrates an example of image display by the displaying circuit 13.

In this embodiment, too, the flow of data of connection display data and transmission data, by a position of each circuit in a network, becomes the same as shown in FIGS. 8 through 10 above mentioned. For example, when all of the topology map 1, the connecting information read circuit 2, the parent node ID list generating circuit 3, the connection display data generating circuit 41, the connecting status image data generating circuit 42 and the displaying circuit 13, shown in FIGS. 13 and 14, are provided on devices of a same node, the flow of connection display data and transmission data becomes the one shown in FIG. 8.

The flow of data and operations other than generation of connection display data and connecting status image data are similar to the embodiments shown in FIGS. 1 and 2.

That is, a parent node ID list generated by the parent node ID list generating circuit 3 is supplied to the connection display data generating circuit 41. The connection display data generating circuit 41 generates connection display data on the basis of the parent node ID list, and outputs them from the terminal 7.

Connection display data inputted trough the terminal 10 are supplied to the connecting status image data generating circuit 42. The connecting status image data generating circuit 42 generates image data to show hierarchical displays of connecting status of a network on the basis of connection display data.

Now, suppose that connection display data correspond to FIG. 15A. In this case, the connecting status image data generating circuit 42; decides that the parts, where values of node IDs sequentially rise, belong to a same hierarchy, and that the parts, where node IDs fall discontinuously, that is, in a data sequence, where lower node IDs than preceding node IDs are arranged, are breakpoints and arranges nodes in each hierarchy. The connecting status image data generating circuit 42, next, decides on nodes in each hierarchy that, among nodes in a hierarchy one stage above the one a node is in, one node having a higher node ID than the node does is its parent node, and seeks for parentage of each node. In this way, the connecting status image data generating circuit 42 generates image data to display the connecting status display shown in FIG. 17 giving hierarchy and the parentage of each node.

The image data are supplied to the displaying circuit 13 (not shown), and the connecting status display shown in FIG. 17 is displayed on the screen. With this display, users can easily secure present hierarchical connecting status.

Sometimes, device information may be transmitted from each node through an IEEE 1394 bus. This device information is supplied to the displaying part 31 of the display layer 24 through the physical and link layer 25, the transaction layer 26 and the API 23 to be supplied to the connecting status image data generating circuit 42 which forms the displaying part 31.

In this case, the connecting status image data generating circuit 42 generates, using the inputted device information, image data to display names and icons of devices instead of the display to show each node shown in FIG. 17.

FIG. 18 shows a display on the display screen of the displaying circuit 13. It should be added that the example in FIG. 18 is not the one corresponding to FIG. 17. In the example in FIG. 18, it is shown that the root is a television receiver to which a notebook-type personal computer, a DV deck and a set-top box are connected in the 2nd hierarchy, in the 3rd hierarchy, a DVD-ROM, a printer, a camcorder, an amplifier and a CD changer are connected, in the 4th hierarchy, a PC camera and a D-VHS video tape recorder are connected. Parentage of each node is shown with lines connecting icons of each node.

With this display, users can easily secure the device to which a connected node actually corresponds and to which hierarchy it is connected.

In connection with the embodiment shown in FIGS. 1 and 2, it is not necessary to have all of the topology map 1, the connecting information read circuit 2, the parent node ID list generating circuit 3, the connection display data generating circuit 41, the connecting status image data generating circuit 42 and the displaying circuit 13, shown in FIGS. 13 and 14, provided on devices of a same node. It is apparent, for example, that a topology map may be on another node, or functions of these circuits may be realized by a circuit other than the bus managing part 27 or by software.

For example, as shown in FIG. 9, the node 32 does not have to have a displaying part. In this case, it is enough if functions of each circuit shown in FIG. 13 can be realized by, for example, the bus managing part 27 or others. Or, as shown in FIG. 10, existence of the node 33 on a network will be of use, because, though it has no functions of each circuit in FIG. 13, it has the displaying part 31 to realize functions of the connecting status image data generating circuit 42 shown in FIG. 14.

Now, suppose that a network is in the connecting status shown in FIG. 16. The bus managing part 27 in FIG. 9 generates, on the basis of information of a topology map, a parent node ID list corresponding to the Table 5 and then, generates connection display data on the basis of this parent node ID list. The connection display data are supplied to the transaction layer 26 and the physical and link layer 25 to be converted by the formatting 5, shown in FIG. 13 and a function thereof, into a transmission data format corresponding to IEEE 1394. The connection display data are arranged in the part for data in an asynchronous packet.

Transmission data from the physical and link layer 25 are transmitted to the node 33 shown in FIG. 10 through an IEEE 1394 bus. The node 33 fetches connection display data from transmission data by the transmission data decoding circuit 11 (shown in FIG. 14) which is a function of the physical and link layer 25. The connection display data are supplied to the displaying part 31 of the display layer 24 through the API 23.

The connecting, status image data generating circuit 42 of the displaying part 31, on the basis, of connection display data, generates image data in order to display connecting status shown in FIG. 17. The image data are given to the displaying circuit 13, and the display shown in FIG. 17 appears on the screen.

When the node 33 receives device information from other nodes through an IEEE 1394 bus, the connecting status image data generating circuit 42 of the displaying circuit 31 generates image data to display names and icons of devices instead of a display shown in FIG. 17.

Thus, in this embodiment, the transmitting side generates, on the basis of a topology map, a parent node ID list to show the correspondence of each node to its parent node, and converts information of this parent node ID list into connection display data in a predetermined data format giving consideration to displaying hierarchical connecting status. The connection display data are also supposed to be converted into a predetermined transmission data format before being transmitted. The receiving side is designed to obtain connection display data from transmission data or directly, and to generate, from the connection display data, image data to display hierarchical connecting status. Consequently, when a node, which has functions to generate image data from connection display data and to display them, exists in a network, hierarchical connecting status can be displayed in the same format whatever device each node is, or even when the transmitting side and the receiving side are not on a same node, or displaying devices are different.

This embodiment, too, is highly effective when a display layer and an API are made common.

Moreover, displaying hierarchical connecting status allows to secure the hop count from a root easily, so as to prevent users from connecting devices exceeding the limit of hop count or to enable users easily to know devices connected exceeding the limit of hop count.

In this embodiment, although the description has been given on a case where a node having functions of the connecting status image data generating circuit 42 reads device information from other nodes, it may be designed so that a node having the bus managing part 27 reads device information from other nodes and transmits it to a node having functions of the connecting status image data generating circuit 42.

That is, each circuit shown in FIGS. 13 and 14 may be formed in any node and any position in a node. As stated above, each circuit shown in FIGS. 13 and 14 may be realized by software. For example, the connecting status image data generating circuit 42 and the displaying circuit 13 may exist on different nodes. Moreover, it may be designed so that connection display data are written in a read/write memory space of a device of a predetermined node and the connection display data stored in this memory space are read by a node having the connecting status image data generating circuit 42.

It is apparent that, in the present invention, various embodiments in a wide range may be made on the basis of the present invention without any departure from the spirit and scope of the invention. The invention should be limited only to the appended claims and not limited to specified embodiments.

What is claimed is:

1. An apparatus for generating connecting status display data comprising an image data generating device configured to generate image data to display connecting status of a network based on inputted transmission data, said inputted transmission data being inputted from a transmitting device via a network, said transmitting device (a) obtaining parent node ID information showing a first correspondence of node ID of each node constituting the network to node ID of its parent node based on data showing port status in a topology map in the network and (b) converting the parent node ID information into said inputted transmission data in a predetermined transmission data format.

2. An apparatus for generating connecting status display data according to claim 1, wherein said image data generating device obtains said first correspondence from said inputted transmission data, and obtains image data to effect display to express node for each node ID and display to express whether nodes are connected between them or not according to said first correspondence obtained.

3. An apparatus for generating connecting status display data according to claim 2, wherein said display to express nodes is a box display including display of node ID or character display including names of devices or image display including figures of devices, and said display to express whether nodes are connected between them or not is a connection display to connect said box display, character display and image display to each other with lines.

4. An apparatus for generating connecting status display data according to claim 1, wherein said image data generating device generates the image data to display the connecting status in said network by obtaining said first correspondence from said inputted transmission data and forming box display or character display including node ID, box display or character display including node ID of the parent node, and connecting display to connect the box display and the character display with lines in order according to each correspondence of said node ID of each node to that of its parent node included in said first correspondence obtained.

5. An apparatus for generating connecting status display data according to claim 1, wherein said image data generating device displays based on device information concerning each device connected to said network.

6. An apparatus for generating connecting status display data according to claim 5, wherein, when bus reset occurs due to a change in connection status in said network, said image data generating device updates said parent node ID information based on device information on devices corresponding to nodes which increased and decreased before and after the bus reset.

7. An apparatus for generating connecting status display data according to claim 6, wherein at last one of said parent node ID information and said device information is stored in a memory space provided at one or more nodes in the network and supplied to said image data generating device.

8. A method of generating connecting status display data comprising:

inputting transmission data to an image data generating device via a network from a transmitting device that obtains parent node ID information showing a first correspondence of node ID of each node constituting the network to node ID of its parent node based on data showing port status in a topology map in the network and converts the parent node ID information to transmission data in a predetermined transmission data format to be outputted; and generating image data to display the connecting status of the network based on the inputted transmission data.

9. A method of generating connecting status display data according to claim 8, wherein generating image data is the one of obtaining said first correspondence from said inputted parent node ID information and obtaining image data to effect display to express node for each node ID and display to express whether nodes are connected between them or not according to said first correspondence obtained.

10. A method of generating connecting status display data according to claim 9, wherein said display to express node is a box display including display of node ID or character display including names of devices or image display including figures of devices, and said display to express whether nodes are connected between them or not is connection display to connect said box, character display and image display to each other with lines.

11. A method of generating connecting status display data according to claim 8, wherein generating step generating image data is the one of generating the image data to display the connecting status in said network by obtaining said first correspondence from said inputted parent node ID information, and forming box display or character display including node ID, box display or character display including node ID of the parent node, and connecting display to connect these box display and character display with lines in order according to each correspondence of said node ID of each node to that of its parent node included in said first correspondence obtained.

12. A method of generating connecting status display data according to claim 8, wherein generating image data includes displaying based on device information concerning each device connected to said network.

13. A method of generating connecting status display data according to claim 12, wherein, when the bus reset occurred due to a change in connection status in said network, said parent node ID information is updated based on device information on devices corresponding to nodes which increased and decreased before and after the bus reset at said image data generating step.

14. A method of generating connecting status display data according to claim 13, wherein at least one of said parent node ID information and said device information is read from a memory space provided at one or more nodes in the network and used at said image data generating step.

* * * * *